(12) United States Patent
Mukoyama et al.

(10) Patent No.: US 6,417,458 B1
(45) Date of Patent: Jul. 9, 2002

(54) SUPERCONDUCTING CABLE FOR ALTERNATING CURRENT

(75) Inventors: Shinichi Mukoyama; Hirokazu Tsubouchi; Kazutomi Miyoshi, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/909,769

(22) Filed: Jul. 20, 2001

(30) Foreign Application Priority Data

Jul. 21, 2000 (JP) .......................... 2000-221140
Jun. 27, 2001 (JP) .......................... 2001-193921

(51) Int. Cl.⁷ .............................................. H01B 12/00
(52) U.S. Cl. .................... 174/125.1; 505/230; 505/231; 505/232; 29/599
(58) Field of Search ........................ 174/125.1, 15.4, 174/15.5; 505/230, 231, 232, 233, 234, 235, 236, 237, 238, 239, 704, 886, 887, 885, 884, 926; 29/599

(56) References Cited

U.S. PATENT DOCUMENTS 5,952,614 A * 9/1999 Ries ........................ 174/106 R
6,215,072 B1 * 4/2001 Fujikami et al. .......... 174/125.1
6,305,069 B1 * 10/2001 Fujikami et al. ............... 29/599
6,313,408 B1 * 11/2001 Fujikami et al. .......... 174/125.1

FOREIGN PATENT DOCUMENTS

JP 08-287746 11/1996
JP 408287746 A * 11/1996
JP 10-312718 11/1998
JP 410312718 A * 11/1998

OTHER PUBLICATIONS

Olsen, et al., "Loss and Inductance Investigations in a 4–layer Superconducting Prototype Cable Conductor", IEEE Transactions on Applied Superconductivity, vol. 9, No. 2, pp. 833–836, (Jun. 1999).

* cited by examiner

Primary Examiner—Kamand Cuneo
Assistant Examiner—I B Patel
(74) Attorney, Agent, or Firm—Knobbe, Martens, Olson & Bear LLP.

(57) ABSTRACT

A superconducting cable for alternating current, comprising conductor layers formed by a plurality of tape-shaped superconducting wires wound around a center member, an electric insulating layer formed outside the conductor layers, and a plurality of shielding layers formed outside the insulating layer, wherein, the conductor layers are formed, where N is a number of layers in the conductor layers and expressed by an integer, by gradually increasing a winding pitch of conductor layers in the same direction from an inner first layer to an N/2 layer when the number of layers is even, or from an inner first layer to a (N−1)/2 layer when the number of layers is odd, and then by gradually decreasing a winding pitch of conductor layers in an opposite direction to the inner layers from a N/2+1 layer to an N layer when the number of layers is even, or from a (N+1)/2 layer to an N layer when the number of layers is odd.

8 Claims, 2 Drawing Sheets

SUPERCONDUCTING CABLE FOR ALTERNATING CURRENT

FIELD OF THE INVENTION

The present invention relates to a superconducting power-transmission cable using superconductive materials, and in particular, to a superconducting power-transmission cable of which conductor layers and shielding layers are adjusted in both winding pitchs and winding directions.

RELATED ART

In superconducting cables for transmitting power with less loss, a conductor is formed by winding tape-shaped superconducting wires around a core or the like in spiral forms, so that flexibility is given to the cable itself. When the cable is required to transmit a large amount of current, the number of layers in the conductor is increased so as to form multi-layered conductor, thus increasing current capacity. Furthermore, in order that an electromagnetic field generated by current flowing through the conductor is avoided from leaking out of the cable, an insulator is formed on and around the outer surface of the conductor, and then tape-shaped superconducting wires are wound on and around the insulator in a spiral form to form shielding layers. The number of those wound wires in the shielding layers is almost the same as that of the conductors, thus containing the electromagnetic field within the cable.

Japanese Patent Provisional Publication No. 62-180910 publication discloses a superconducting cable, which is formed by winding a complex multi-filamentary superconducting member in spiral forms around the outer surface of a normal conducting member so that right-handed wound layers and left-handed wound layers are formed alternately thereon.

Moreover, Japanese Patent Provisional Publication No. 8-287746 publication discloses a superconducting cable for alternating current, in which a plurality of layers of tape-shaped superconducting wires are wound around a center member. In the superconducting cable, the winding pitch of the wires becomes larger as the windings proceed to outer layers, in order to make all the layers equal in inductance to each other.

Moreover, Japanese Patent Provisional Publication No. 9-45150 publication discloses a multi-layer superconductor, in which a superconducting wires are wound in spiral forms around a core to form a plurality of layers. In the multi-layer superconductor, a maximum of the winding pitch is specified, and the winding pitch becomes shorter as the winding proceeds from an inner layer to an outer layer.

SUMMARY OF THE INVENTION

One embodiment of the superconducting cable for alternating current according to the present invention is a superconducting cable for alternating current comprising conductor layers formed by a plurality of tape-shaped superconducting wires wound around a center member, an electric insulating layer formed outside the conductor layers, and a plurality of shielding layers formed outside the insulating layers, wherein the cable comprises:

(a) the conductor layers being formed, where N is the number of layers in the conductor layers and expressed by an integer, by gradually increasing a winding pitch of conductor layers in the same direction from an inner first layer to an N/2 layer when the number of layers is even, or from an inner first layer to a (N−1)/2 layer when the number of layers is odd, and then by gradually decreasing the winding pitch of conductor layers, in an opposite direction to the inner layers, from a N/2+1 layer to an N layer when the number of layers is even, or from a (N+1)/2 layer to an N layer when the number of layers is odd; and (b) the shielding layers being formed, where n is the number of layers in the shielding layers and expressed by an integer, by gradually increasing a winding pitch of shielding layers in the same direction from an inner first layer to an n/2 layer when the number of layers is even, or from an inner first layer to a (n−1)/2 layer when the number of layers is odd, and then by gradually decreasing the winding pitch of shielding layers, in an opposite direction to the inner layers, from a n/2+1 layer to an n layer when the number of layers is even, or from a (n+1)/2 layer to an n layer when the number of layers is odd.

DETAILED DESCRIPTION OF THE PREFERRED EMBODIMENTS

Figure 1:
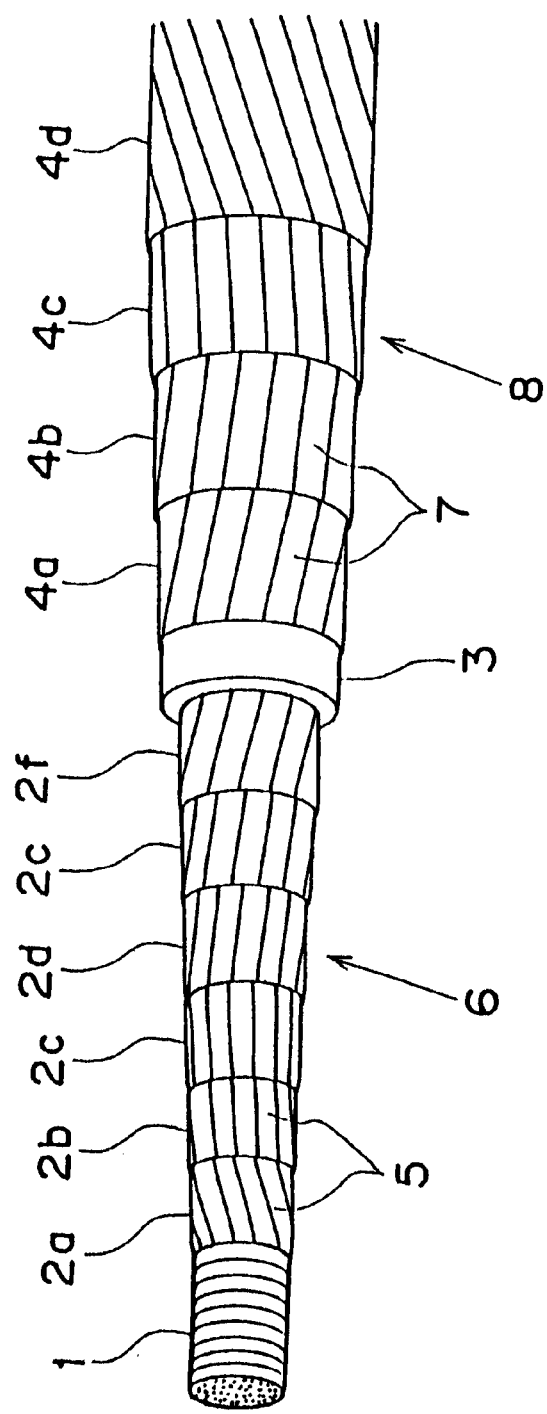
FIG. 1 is a schematic side view showing a multi-layer superconducting cable according to an embodiment 1 of the present invention.

Embodiments of the superconducting cable according to the present invention will now be described.

A practical superconducting cable is generally manufactured by the following procedures. For example, a first layer in the conductor layers is formed by winding, in a spiral form and without gap therebetween, tape-shaped superconducting wires made of oxide superconducting material around a pipe-like flexible core made of stainless steel. After completion of winding the first layer, the tape-shaped superconducting wires are further wound on and around the first layer in a spiral form without gap therebetween, in the same manner as in the first layer, thus forming the second layer. In a similar way to that, the wires are wound in consecutive order in the spiral form and without gap therebetween on the outer circumference of the second layer, thus forming the third, the fourth, . . . layers. This way of winding brings about a plurality of conductor layers.

Because high voltage is applied to the conductor layers, an insulting layer is to be formed outside the conductor layers. The insulating layer, which uses such materials effecting electric insulation as polymer material or paper, are formed so as to be wound around the conductor layers. Like the conductor layers, multi-layer shielding layers are formed on (the outer surface of) the insulating layer by winding in spiral form tape-shaped superconducting wires. Current is also applied to the shielding layers, but its flowing direction is opposite to that to the conductor layers, so that the shielding layers can have a function of preventing a magnetic field from leaking out of the cable.

An object of the present invention is to reduce an alternating current loss of the superconducting cable.

In order to solve conventional problems, the present inventors have studied intensively. As a result it is found that by means of adjusting winding directions and winding pitches of conductor layers and shielding layers, current flowing through all the layers is made uniform to lower alternating current loss, and concurrently, generation of the longitudinal magnetization is suppressed to lower alternating current loss caused by the longitudinal magnetic field. Furthermore, a recent study conducted by the present inventors has revealed that a circumferential magnetic field was considered a primary cause for magnetization loss, however, the longitudinal magnetization that remains within the tape increases alternating current loss (magnetization loss due to the longitudinal magnetization), which prevents the superconducting cable from having decreased alternating current loss.

One embodiment of the superconducting cable for alternating current according to the present invention is a superconducting cable for alternating current, comprising conductor layers formed by a plurality of tape-shaped superconducting wires wound around a center member, an electric insulating layer formed outside the conductor layers, and a plurality of shielding layers formed outside the insulating layer, wherein (a) the conductor layers are formed, where N is a number of layers in the conductor layer and expressed by an integer, by gradually increasing a winding pitch of conductor layers in the same direction from an inner first layer to an N/2 layer when the number of layers is even, or from an inner first layer to a (N−1)/2 layer when the number of layers is odd, and then by gradually decreasing a winding pitch of conductor layers in an opposite direction to the inner layers from a N/2+1 layer to an N layer when the number of layers is even, or from a (N+1)/2 layer to an N layer when the number of layers is odd; and (b) the shielding layers are formed, where n is the number of layers in the shielding layers and expressed by an integer, by gradually increasing a winding pitch of shielding layers in the same direction from an inner first layer to an n/2 layer when the number of layers is even, or from an inner first layer to a (n−1)/2 layer when the number of layers is odd, and then by gradually decreasing the winding pitch of shielding layers in an opposite direction to the inner layers from a n/2+1 layer to an n layer when the number of layers is even, or from a (n+1)/2 layer to an n layer when the number of layers is odd.

In addition, in the superconducting cable for alternating current according to the present invention, the winding in the conductor layers is an opposite in direction and the winding pitch are substantially the same between first layer and N-th layer, between second layer and (N−1)-th layer, in like manner, and, between N/2-th layer and (N/2+1)-th layer when the number of conductors is even, or between (N−1)/2-th layer and (N+3)/2-th layer when the number of conductor layers is odd.

Moreover, in the superconducting cable for alternating current according to the present invention, the winding in the shielding layers is an opposite in direction and the winding pitch are substantially the same between first layer and n-th layer, between second layer and (n−1)-th layer, in like manner, and, between n/2-th layer and (n/2+1)-th layer when the number of conductors is even, or between (n−1)/2-th layer and (n+3)/2-th layer when the number of conductor layers is odd.

Moreover, the N/2-th and (N/2+1)-th layers in the conductor layers when the number of conductor layers is even, or, the conductor layers from the (N−1)/2-th to (N+3)/2-th layers when the number of conductor layers is odd, are formed by the tape-shaped superconducting wires of which filaments are untwisted, and the N-th layer in the conductor layers and the first layer in the shielding layers are formed by the tape-shaped superconducting wires of which filaments are twisted.

Moreover, the n/2-th and (n/2+1)-th layers in the shielding layers when the number of shielding layers is even, or, the shielding layers from the (n−1)/2-th to (n+3)/2-th layers when the number of shielding layers is odd, are formed by the tape-shaped superconducting wires of which filaments are untwisted.

Moreover, the winding pitch is selected within a range from 50 to 1000 mm, a tolerance for the substantially same winding pitch in the conductor layers and shielding layers is within a double of the winding pitch.

The superconducting cable for alternating current according to the present invention is based on the following concept. More specifically, in order to uniformly provide current into each of the multi-layer conductors, it is necessary that the value of impedance in each layer is the same. When current flows uniformly into each layer, the impedance $Z_i$ of the i-th layer can be expressed by the following equation (1):

$$Z_i = A\left(L_i + \sum_{i \neq j} M_{ij}\right), \quad (1)$$

wherein $L_i$ is the self-inductance of each layer, $M_{ij}$ is the mutual inductance between the i-th layer and another j-th layer, and A is a constant. In addition, the self-inductance $L_i$ and mutual inductance $M_{ij}$ can be expressed by the following equations (2) and (3), respectively:

$$L_i = \mu_0 \frac{\pi \cdot r_i^2}{lp_i^2} + \frac{\mu_0}{2\pi}\ln\left(\frac{D}{r_i}\right), \quad (2)$$

$$M_{ij} = \frac{a_i a_j \mu_0}{lp_i \cdot lp_j}\pi \cdot r_i^2 + \frac{\mu_0}{2\pi}\ln\left(\frac{D}{r_j}\right), \quad (3)$$

Wherein $\mu_0$ is the vacuum permeability, $r_i$ and $r_j$ are the radii of the i-th and j-th layers, respectively, $lp_i$ an $lp_j$ are the winding pitch in the i-th and j-th layers, respectively, D is the outermost radius of the shielding layers, and $a_i$ and $a_j$ are constants indicative of the winding directions (the right-handed screw direction is +1 and the left-handed screw direction is −1).

An object of the present invention is to make the impedance Zi of each layer equal to each other by changing the winding pitch, winding direction, and winding radius of each layer on the basis of the foregoing equation (1). In the present invention, the winding pitchs becomes gradually larger in the same direction as to the inner first layer to the N/2-th layer (when the number of conductor layers is odd, to the (N−1)/2-th layer), then becomes gradually smaller in the opposite direction to the inner one as to the (N/2+1)-th layer (when the number of conductor layers is odd, the (N+1)/2-th layer) to the N-th layer, thus forming the conductor layer.

In FIG. 1, the first layer of conductor layers is formed by winding, in a spiral form without gap therebetween, a tape-shaped superconducting wire 5 around a cylindrical hollow center member 1 made of a flexible material, such as copper, aluminum, and stainless steel or the like. After completing the winding of the first layer 2a, the tape-shaped superconducting wire 5 is wound on and around the first layer 2a in a spiral form without gap therebetween, like the first layer 2a, thus forming the second layer 2b. In the same manner, the wires are wound in a spiral form without gap therebetween so as to form a plurality of layers 2c to 2f, thereby forming conductor layers 6 made up of a plurality of layers 2a to 2f. An electric insulating layer 3 is further formed on the conductor layers 6, and then shielding layers 8 are formed on the insulating layer 3 by winding, four layers in spiral forms, a tape-shaped superconducting wires 7 around the insulating layer 3. The tape-shaped superconducting wires 7 are shaped in a similar manner to that used in the conductor layers 6.

In the present invention, the conductor layers 6 and shielding layers 8 of the superconducting cable are formed into N-pieces of layers and n-pieces of layers, respectively. Suppose that the layers of each of the conductor and shielding layers 6 and 8 are counted in turn from the inside as being the first layer, the second layer, and so forth. In the conductor layers 6, when the number of layers is even, the winding pitch in each layer becomes larger and larger in order as being "the first layer<the second layer< . . . <the N/2-th layer, then becomes smaller and smaller in order as being "the (N/2+1)-th layer>the (N/2+2)-th layer> . . . >the (N−1)-th layer>the N-th layer. In contrast, when the number of layers is odd, the winding pitch in each layer becomes larger and larger in order as being "the first layer<the second layer< . . . <the (N−1)/2-th layer, then becomes smaller and smaller in order as being "the (N+1)/2-th layer>the (N+1)/2+1-th layer> . . . >the (N−1)-th layer>the N-th layer.

In the shielding layers 8, when the number of layers is even, the winding pitch in each layer becomes larger and larger in order as being "the first layer<the second layer< . . . <the n/2-th layer, then becomes smaller and smaller in order as being "the (n/2+1)-th layer>the (n/2+2)-th layer> . . . >the (n−1)-th layer>the n-th layer. In contrast, when the number of layers is odd, the winding pitch in each layer becomes larger and larger in order as being "the first layer<the second layer< . . . <the (n−1)/2-th layer, then becomes smaller and smaller in order as being "the (n+1)/2-th layer>the (n+1)/2+1-th layer> . . . >the (n−1)-th layer>the n-th layer.

As to the winding directions, the same winding direction is applied to inner layers including the first layer to N/2-th layer in the conductor layers 6 and the first layer to the n/2-th layer (to the (n−1)/2-th layer when the number of layers is odd) in the shielding layers 8. The opposite winding direction to that applied to the inner layers is applied to the remaining outer layers including from the (N/2+1)-th layer (the (N+1)/2-th layer when the number of conductor layers is odd) to the N-th layer in the conductor layers and the (n/2+1)-th layer (the (n+1)/2-th layer when the number of conductor layers is odd) to the n-th layer in the shielding layers. Additionally, it is preferable that the initial winding directions for the first layers in both conductor and shielding layers 6 and 8 are the same.

As to the winding pitch, the winding pitch for inner conductor layers and inner shielding layers are assigned as follows. For inner layers including the first layer to the N/2-th layer (to the (N−1)/2-th layer when the number of conductor layers is odd) in the conducting layers and the first layer to the n/2-th layer (to the (n−1)/2-th layer when the number of shielding layers is odd) in the shielding layers, the winding pitch is set so as to be larger as the layer advances outward, with the same winding direction kept. Likewise, for outer layers including the (N/2+1)-th layer (the (N+1)/2-th layer when the number of conductor layers is odd) to the N-th layer in the conductor layers and the (n/2+1)-th layer (the (n+1)/2-th layer when the number of shielding layers is odd) to the n-th layer in the shielding layers, the winding pitch is set so as to be smaller as the layer advances outward, with keeping the same winding direction which is opposite to that of the inner layers. The above-mentioned way of setting of the winding pitch allows the impedance of each layer to be equal to each other, thus current flowing each layer being uniform. Therefore, current distributions become uniform over the layers, thus reducing alternating current loss.

Furthermore, the winding pitchs of both conductor layers and insulating layers have the following relationships:

the first layer≈the N-th layer; the second layer≈the (N−1)-th layer; the third layer≈the (N−2)-th layer, . . . ; and the first layer≈the n-th layer; the second layer≈the (n−1)-th layer; the third layer≈the (n−2)-th layer, . . . , where the sign "≈" means that both winding pitchs are substantially the same.

The winding pitch should be adjusted within the range from 50 to 1000 mm. With the winding pitch being below 50 mm, the bend radius of the tape wire to be wound becomes too small for bending. As a result, bending distortion becomes large, thus deteriorating the critical current characteristic of a superconducting wire. On the other hand, with the winding pitch being over 1000 mm, a winding force required to wind the tape around the center member is lowered, thus causing disturbances in winding. A further preferable winding pitch is within the range from 80 to 600 mm.

Since irregularities in current distributions are reduced as low as being no obstacles for practical applications, as far as the range of pitch lengths is within the length ranging from the winding pitch to two times of the same winding pitch, a winding pitch selected up to the range whose maximum is equal to the double of a certain winding pitch may be tolerated as being substantially the same winding pitch. For example, if the winding pitch at a certain layer is 100 mm, the winding pitch ranging from 100 to 200 mm is tolerated as being substantially the same in length.

In the conductor layers, the first layer to the N/2-th layer (the (N−1)/2-th layer when the number of conducting layers is odd) (i.e., inner layers) are opposite in the winding directions to the (N/2+1)-th layer (the (N+1)/2-th layer when the number of conductor layers is odd) to the N-th layer (i.e., outer layers). In addition, the winding pitch of the corresponding layers (counted from the boundary therebetween, i.e., N/2−1 and N/2+2, N/2−2 and N/2+3 for example) in the inner layers and outer layers are substantially the same. Therefore, longitudinal magnetic field generated from the corresponding layers are-cancelled out, so that eddy current loss and alternating current loss in the tape-shaped superconducting wire due to the longitudinal magnetic field are reduced. The same function and effect are shown in the shielding layers. As a result, compared to the conventional superconducting cable, the alternating current loss can be remarkably lowered in the present invention.

The winding directions of the first layer of the conductor layers and the first layer of the shielding layers are set in such a manner that both longitudinal magnetic field each remaining in the shielding layers and the conductor layers due to incomplete cancellation are directed to mutually opposite directions. This allows the residual longitudinal magnetic field to be cancelled out. Thus, the eddy current loss and the alternating current loss of the tape-shaped superconducting wire are lowered.

The tape-shaped superconducting wire has the following property: when the filaments of the wire are twisted, the wire exhibits a smaller amount of alternating current loss under the transverse magnetic field, while it exhibits a larger amount of alternating current loss under the longitudinal magnetic field. On the contrary, when the filaments of the wire are untwisted, the wire exhibits a larger amount of alternating current loss under the transverse magnetic field, while it exhibits a smaller amount of alternating current loss under the longitudinal magnetic field.

The tape-shaped superconducting wire with its filament untwisted is used for layers each of which longitudinal magnetic field (i.e., a magnetic field generated in the axial direction of a conductor) is relatively higher in strength, more specifically, the layer in which the longitudinal magnetic field is at least one-third of the transverse magnetic field. Such layers are the N/2-th and (N/2+1)-th layers (from (N−1)/2-th to (N+3)/2-th layers when the number of conductor layers is odd) in the conductor layers, and the n/2-th and (n/2+1)-th layers (the (n−1)/2-th to (n+3)/2-th layers when the number of shielding layers is odd) in the shielding layers. On the other hand, the tape-shaped superconducting wires with filaments twisted are used for layers each of which transverse magnetic field (i.e., a magnetic field generated in the circumferential direction of a conductor) is relatively higher in strength, more specifically, the layer in which the transverse magnetic field is at least 200 gauss and at least five times the longitudinal magnetic field. Such layers include the N-th layer of the conductor layers and the first layer of the shielding layers.

Intermediate layers of the conductor and shielding layers, which are relatively higher strength for the longitudinal magnetic field and lower strength for the transverse magnetic field, are formed by winding in spiral form the tape-shaped superconducting wires with filaments untwisted. The outermost layer of the conductor layers and the innermost layer of the shielding layers, which are smaller in the strength of the longitudinal magnetic field and larger in the strength of the transverse magnetic field, are formed by winding in spiral form the tape-shaped superconducting wire with filaments twisted. Thus winding the tape-shaped superconducting wires in the above manner provides a superconducting cable of which alternating current loss is further decreased.

Materials used as the insulating layer 3 include insulating tapes, such as kraft paper, polyethylene films, polyethylene paper, and polypropylene laminated paper. The insulating tapes are wound in a spiral form around the conductor layers to form laminated insulating layers. It is enough for the insulating layer that there is caused no cracks or crashes in the insulating layer at the temperature of liquid nitrogen. Thus, for example, the insulating layer may be formed by polyethylene resin.

The superconducting cable for alternating current according to the present invention is available for superconducting power-transmission cables used as underground cables, which transmit high voltages of 6 to 100 kV or ultra-high voltages of at least 100 kV. In this case, when the present invention is applied to such cables, current flowing through each layer can be uniform and its alternating current loss can be lowered. Concurrently, the longitudinal magnetic field to be generated can be suppressed down to a small amount, thus reducing its alternating current loss caused by the longitudinal magnetic field.

According to the superconducting cable for alternating current according to the present invention, the following conventional problems can be overcome:

More specifically, (1) when each layer of the conductor layers is wound in the same direction, the longitudinal magnetic field is large, so that eddy current is caused in the center member due to the longitudinal magnetic field, thus increasing the alternating current loss. (2) When conductor layers and the shielding layers are wound, layers by layers, in alternate direction, with the same winding pitchs in order to decrease the alternating current loss of the superconducting cable due to its longitudinal magnetic field, current that should flow into each layer shifts to outer layers, resulting in that a current distribution over the layers becomes unbalanced, thereby leading to a large amount of alternating current loss. On the other hand, when wires are wound in the same direction in spiral forms and the winding pitch becomes shorter as the winding advances to an outer one in order to obtain a uniform current distribution over the layers, alternating current loss occurs due to the longitudinal magnetic field, resulting in that expected alternating current loss cannot be attained. (3) If the wires are wound in the same direction, magnetic field (longitudinal magnetic field ) is generated along the axial direction of the cable. This longitudinal magnetic field causes eddy current in the center member or the like, which leads to a large amount of alternating current loss. (4) When right-handed and left-handed layers are formed alternately with their winding pitchs maintained at the same value, current that should flow into the layers concentrates to outer layers, because impedance becomes smaller as the winding proceeds up to an outer layer. As a result, the alternating current loss increases.

EXAMPLE

The superconducting cable for alternating current according to the present invention will now be explained in more detail by examples Example 1

FIG. 1 shows a schematic side view for explaining a multi-layer superconducting cable in this example. A center member 1 is 18 mm in outer diameter and shaped into a flexible hollow pipe made of copper. On and around the center member 1, tape-shaped superconducting wires 5, which is 3 mm in width and 0.2 mm in thickness, were wound in spiral form to provide six layers from a layer 2a to a layer 2f, thereby forming conductor layers 6. On and around the conductor layers (superconducting layer) 6, a polypropylene laminated paper tape, which is 30 mm in width and 0.1 mm in thickness) was wound in a spiral form to have a plurality of layers laminated one after another. The tapes were laminated up to a thickness of 6 mm, thus forming an electrically insulating layer 3. On and around the electrically insulating layer 3, a tape-shaped superconducting wire 7 of which width is 3 mm (the same in width as the conductor layers) and of which thickness is 0.2 mm was wound in spiral form to form four layers, thereby providing shielding layers 8. The manufactured superconducting cable had an outer diameter of 39 mm.

The winding directions and winding pitchs in the spiral form are shown in Table 1. Also, in this example, peak values (when current of 3000 A is supplied) of the vertical and transverse magnetic fields at the center of each layer of the superconducting cable are shown in Table 2. As clearly shown in Table 2, layers that exhibits relatively stronger longitudinal magnetic field (each of which is, in strength, at least one-third of the transverse magnetic layer) are the third and fourth conductor layers, as well as the second and third shielding layers. Additionally, layers that exhibits stronger transverse magnetic fields (each of which is, in strength, at least 200 gauss and at least five times the longitudinal magnetic field ) are the fifth and sixth conductor layers, as well as the first shielding layer.

When alternating current of 3000 A was supplied through the conductors, alternating current loss per 1 meter was 1

W/m. It is found that the amount of the loss is reduced to one-hundredth of that of the cable in which the wires are wound in alternately changed winding directions but with the same winding pitch. It is also found that the loss is reduced to one-thousandth of that of the cable in which the wires are wound with adjusted winding pitch but with the same winding direction.

Example 2

Figure 2:
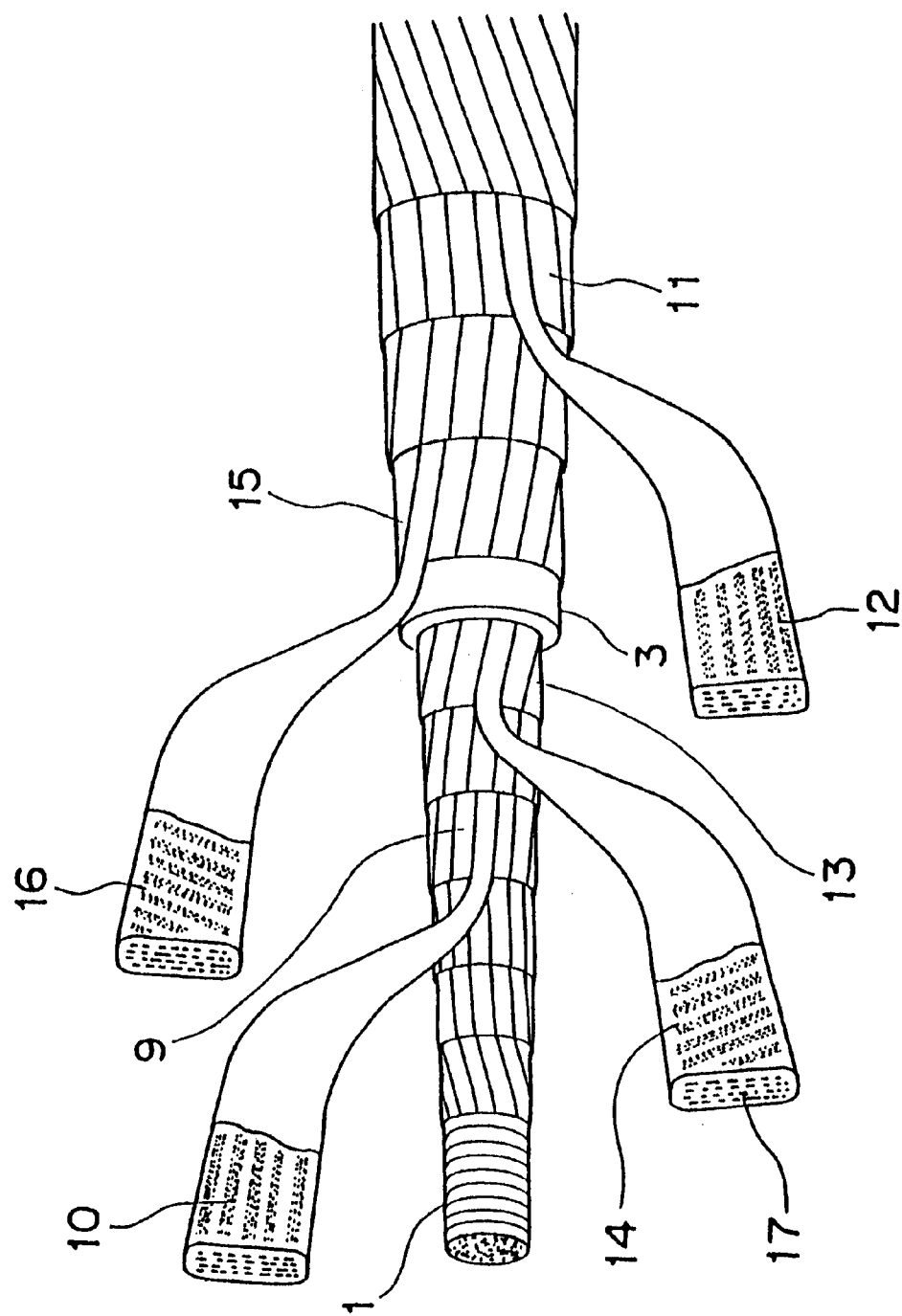
FIG. 2 is a schematic side view showing a multi-layer superconducting cable according to an embodiment 2 of the present invention.

FIG. 2 shows another superconducting cable for alternating current according to the present invention. In the similar manners to those in Example 1, the conductor layers, insulating layers, and shielding layers were formed. In fabricating this superconducting cable, an intermediate conductor layer (the (N/2+1)-th layer) 9 is wound using a tape-shaped superconducting wire 10 with untwisted filaments. In addition, an intermediate shielding layer (the (n/2+1)-th layer) 11 is wound using a tape-shaped superconducting wire 13 with untwisted filaments. The outermost conductor layer (the N-th layer) 13 is formed using a tape-shaped superconducting wire 14 with twisted filaments 17. Furthermore, the innermost shielding layer (the first layer) 15 is formed using a tape-shaped superconducting wire 16 with twisted filaments.

Alternating current of 3000 A was supplied through the conductors. As a result, it is found that the alternating current loss further reduces by ½, compared to a cable in which, like Example 1, all the layers are formed with tape-shaped superconducting wires of twisted filaments with winding pitch adjusted.

thereby providing shielding layers. The winding directions and winding pitchs are shown in Table 3.

TABLE 1

| | Direction and Pitch of Spiral Winding | | |
|---|---|---|---|
| Conductor Layer | Winding Pitch | Shielding Layer | Winding Pitch |
| 1 (Innermost Layer) | 80 mm Left-Handed Winding | 1 (Innermost Layer) | 125 mm Right-Handed Winding |
| 2 | 115 mm Left-Handed Winding | 2 | 305 mm Right-Handed Winding |
| 3 | 300 mm Left-Handed Winding | 3 | 580 mm Left-Handed Winding |
| 4 | 580 mm Right-Handed Winding | 4 (Outermost Layer) | 100 mm Left-Handed Winding |
| 5 | 150 mm Right-Handed Winding | | |
| 6 (Outermost Layer) | 80 mm Right-Handed Winding | | |

TABLE 2

| | Winding Pitch | | | | |
|---|---|---|---|---|---|
| Conductor Layer | Longitudinal Magnetic Field (Gauss) | Transverse Magnetic Field (Gauss) | Shielding Layer | Longitudinal Magnetic Field (Gauss) | Transverse Magnetic Field (Gauss) |
| 1 (Innermost Layer) | 19 | 105 | 1 (Innermost Layer) | 4 | 333 |
| 2 | 60 | 204 | 2 | 82 | 245 |
| 3 | 115 | 297 | 3 | 110 | 161 |
| 4 | 135 | 384 | 4 (Outermost Layer) | 94 | 79 |
| 5 | 124 | 467 | | | |
| 6 (Outermost Layer) | 82 | 545 | | | |

Example 3

As an example 3, there will be explained a cable having conductor layers and shielding layers, in which the number of conductor layers and the number of shielding layers are odd, respectively. In the similar manners to those in Example 1, a center member is 18 mm in outer diameter and shaped into a flexible hollow pipe made of copper. On and around the center member, tape-shaped superconducting wires were wound in spiral form to provide seven layers, thereby forming conductor layers. On and around the conductor layers (superconducting layer), a polypropylene laminated paper tapes were wound in a spiral form to have a plurality of layers laminated one after another. The tapes were laminated up to a thickness of 6 mm, thus forming an electrically insulating layer. On and around the electrically insulating layer, like the conductor layers, a tape-shaped superconducting wires were wound in spiral form to form five layers,

TABLE 3

| | Direction and Pitch of Spiral Winding | | |
|---|---|---|---|
| Conductor Layer | Winding Pitch | Shielding Layer | Winding Pitch |
| 1 (Innermost Layer) | 80 mm Left-Handed Winding | 1 (Innermost Layer) | 100 mm Right-Handed Winding |
| 2 | 120 mm Left-Handed Winding | 2 | 230 mm Left-Handed Winding |
| 3 | 320 mm Left-Handed Winding | 3 | 640 mm Right-Handed Winding |
| 4 | 600 mm Right-Handed Winding | 4 | 120 mm Right-Handed Winding |

TABLE 3-continued

Direction and Pitch of Spiral Winding

| Conductor Layer | Winding Pitch | Shielding Layer | Winding Pitch |
|---|---|---|---|
| 5 | 171 mm Right-Handed Winding | 5 (Outermost Layer) | 85 mm Right-Handed Winding |
| 6 | 103 mm Right-Handed Winding | | |
| 7 (Outermost Layer) | 70 mm Right-Handed Winding | | |

In the superconducting cable for alternating current according to the present invention, optimizing combinations of the winding directions and winding pitchs of the conductor and shielding layers makes it possible to uniform currents each flowing through each layer. Moreover, reducing the longitudinal magnetic field permits the alternating current loss caused in the cable to be reduced remarkably. Hence, loss of power caused when transmitted through this superconducting cable can be lowered, and cooling power required to cool the superconducting cable can thus be lowered. An energy saving effect is excellent. For such global objects as saving energy resources which are limited and suppressing the generation of CO2, the superconducting cable of the present invention is remarkably effective.

What is claimed is:

1. A superconducting cable for alternating current, comprising conductor layers formed by a plurality of tape-shaped superconducting wires wound around a center member, an electric insulating layer formed outside the conductor layers, and a plurality of shielding layers formed outside the insulating layers, wherein
   (a) the conductor layers are formed, where N is a number of layers in the conductor layers and expressed by an integer, by gradually increasing a winding pitch of conductor layers in the same direction from an inner first layer to an N/2 layer when the number of layers is even, or from an inner first layer to a (N−1)/2 layer when the number of layers is odd, and then by gradually decreasing a winding pitch of conductor layers in an opposite direction to the inner layers from a N/2+1 layer to an N layer when the number of layers is even, or from a (N+1)/2 layer to an N layer when the number of layers is odd; and
   (b) the shielding layers are formed, where n is the number of layers in the shielding layers and expressed by an integer, by gradually increasing a winding pitch of shielding layers in the same direction from an inner first layer to an n/2 layer when the number of layers is even, or from an inner first layer to a (n−1)/2 layer when the number of layers is odd, and then by gradually decreasing the winding pitch of shielding layers in an opposite direction to the inner layers from a n/2+1 layer to an n layer when the number of layers is even, or from a (n+1)/2 layer to an n layer when the number of layers is odd.

2. The superconducting cable for alternating current as claimed in claim 1, wherein the winding in the conductor layers is an opposite in direction and the winding pitch are substantially the same between first layer and N-th layer, between second layer and (N−1)-th layer, in like manner, and, between N/2-th layer and (N/2+1)-th layer when the number of conductors is even, or between (N−1)/2-th layer and (N+3)/2-th layer when the number of conductor layers is odd.

3. The superconducting cable for alternating current as claimed in claim 1 or 2, wherein the winding in the shielding layers is an opposite in direction and the winding pitch are substantially the same between first layer and n-th layer, between second layer and (n−1)-th layer, in like manner, and, between n/2-th layer and (n/2+1)-th layer when the number of conductors is even, or between (n−1)/2-th layer and (n+3)/2-th layer when the number of conductor layers is odd.

4. The superconducting cable for alternating current as claimed in claim 1 or 2, wherein the N/2-th and (N/2+1)-th layers in the conductor layers when the number of conductor layers is even, or, the conductor layers from the (N−1)/2-th to (N+3)/2-th layers when the number of conductor layers is odd, are formed by the tape-shaped superconducting wires of which filaments are untwisted, and the N-th conductor layer and the first shielding layer are formed by the tape-shaped superconducting wires of which filaments are twisted.

5. The superconducting cable for alternating current as claimed in claim 3, wherein the N/2-th and (N/2+1)-th layers in the conductor layers when the number of conductor layers is even, or, the conductor layers from the (N−1)/2-th to (N+3)/2-th layers when the number of conductor layers is odd, are formed by the tape-shaped superconducting wires of which filaments are untwisted, and the N-th conductor layer and the first shielding layer are formed by the tape-shaped superconducting wires of which filaments are twisted.

6. The superconducting cable for alternating current as claimed in claim 1 or 2, wherein the n/2-th and (n/2+1)-th layers in the shielding layers when the number of shielding layers is even, or, the shielding layers from the (n−1)/2-th to (n+3)/2-th layers when the number of shielding layers is odd, are formed by the tape-shaped superconducting wires of which filaments are untwisted.

7. The superconducting cable for alternating current as claimed in claim 2, wherein the winding pitch is selected within a range from 50 to 1000 mm, a tolerance for the substantially same winding pitch in the conductor layers and shielding layers is within a double of the winding pitch.

8. The superconducting cable for alternating current as claimed in claim 3, wherein the winding pitch is selected within a range from 50 to 1000 mm, a tolerance for the substantially same winding pitch in the conductor layers and shielding layers is within a double of the winding pitch.

* * * * *